(12) United States Patent
Okada et al.

(10) Patent No.: US 6,976,385 B2
(45) Date of Patent: Dec. 20, 2005

(54) LATERAL WHEEL BALANCING APPARATUSES AND METHODS FOR LATERAL WHEEL BALANCING

(76) Inventors: Lance Okada, 5804 W. 27th St., Greeley, CO (US) 80634; Stuart Imai, 1806 Carnegie La., #3, Redondo Beach, CA (US) 90278

(*) Notice: Subject to any disclaimer, the term of this patent is extended or adjusted under 35 U.S.C. 154(b) by 0 days.

(21) Appl. No.: 10/890,634

(22) Filed: Jul. 14, 2004

(65) Prior Publication Data

US 2005/0039522 A1 Feb. 24, 2005

Related U.S. Application Data

(60) Provisional application No. 60/487,337, filed on Jul. 14, 2003.

(51) Int. Cl.$^7$ .................................................. G01M 1/12
(52) U.S. Cl. ...................................................... 73/66
(58) Field of Search ........................... 73/66, 459, 480, 73/481, 482, 487, 65.01, 65.09

(56) References Cited

U.S. PATENT DOCUMENTS

| | | | |
|---|---|---|---|
| 2,668,443 A | * | 2/1954 | Welch .......................... 73/66 |
| 3,877,315 A | | 4/1975 | Carrigan |
| 4,009,612 A | | 3/1977 | Johnson |
| 4,269,451 A | | 5/1981 | Narang |
| 4,352,291 A | | 10/1982 | Curchod et al. |
| 4,366,707 A | | 1/1983 | Jarschel |
| 4,479,381 A | | 10/1984 | Kounkel et al. |
| 5,103,595 A | | 4/1992 | Dale et al. |
| 5,447,064 A | | 9/1995 | Drechsler et al. |
| 5,450,337 A | | 9/1995 | Chuan-Yuan et al. |
| 5,563,342 A | | 10/1996 | Drechsler et al. |
| 5,689,069 A | | 11/1997 | Corghi |
| 5,979,237 A | | 11/1999 | Spaggiari |
| 5,983,717 A | | 11/1999 | Diez |
| 6,122,957 A | | 9/2000 | Bux et al. |
| 6,170,324 B1 | | 1/2001 | Reese et al. |
| 6,244,108 B1 | | 6/2001 | McInnes et al. |
| 6,435,027 B1 | | 8/2002 | Colarelli, III et al. |
| 6,484,574 B1 | | 11/2002 | Douglas et al. |
| 6,546,635 B1 | | 4/2003 | Gerdes |
| 6,672,158 B1 | | 1/2004 | Goebel et al. |

* cited by examiner

*Primary Examiner*—John E. Chapman
(74) *Attorney, Agent, or Firm*—Christie, Parker & Hale, LLP

(57) ABSTRACT

Apparatuses and methods for laterally balancing a wheel or for determining the location for placing a balancing weight on the wheel for laterally balancing the wheel are provided. A method provided includes laterally balancing a wheel on a elongate member. An apparatus includes a member on which the wheel is laterally balanced.

47 Claims, 9 Drawing Sheets

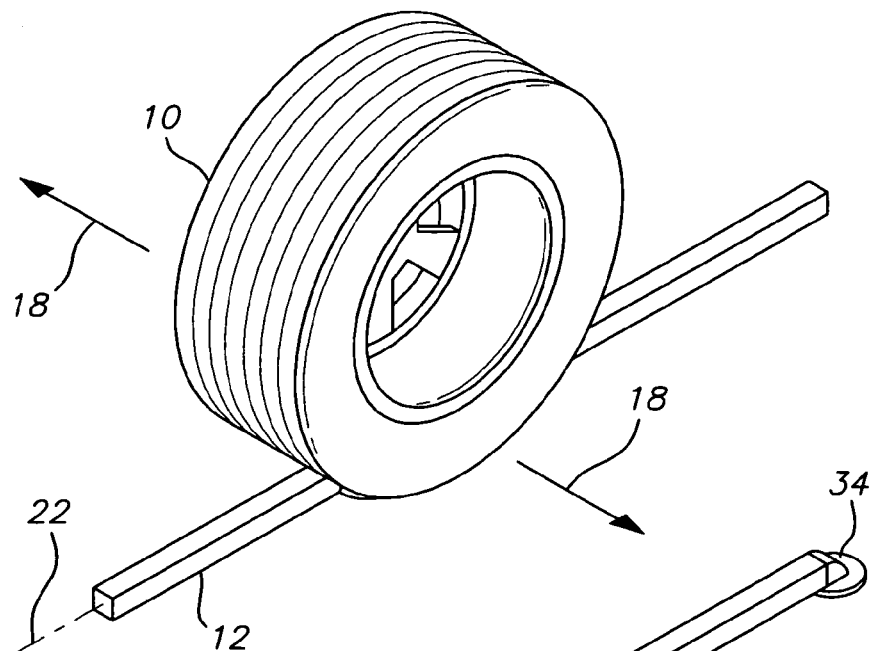
FIG.2
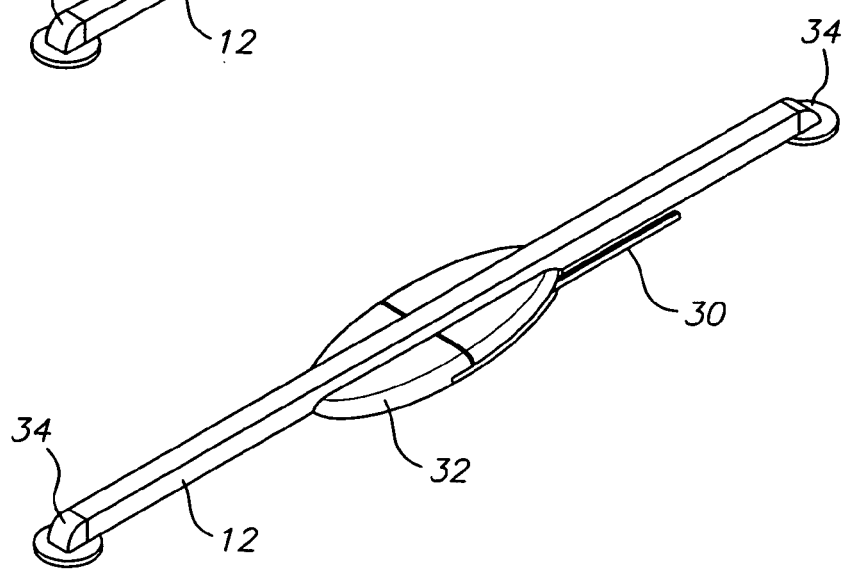
FIG.3A
FIG.3B

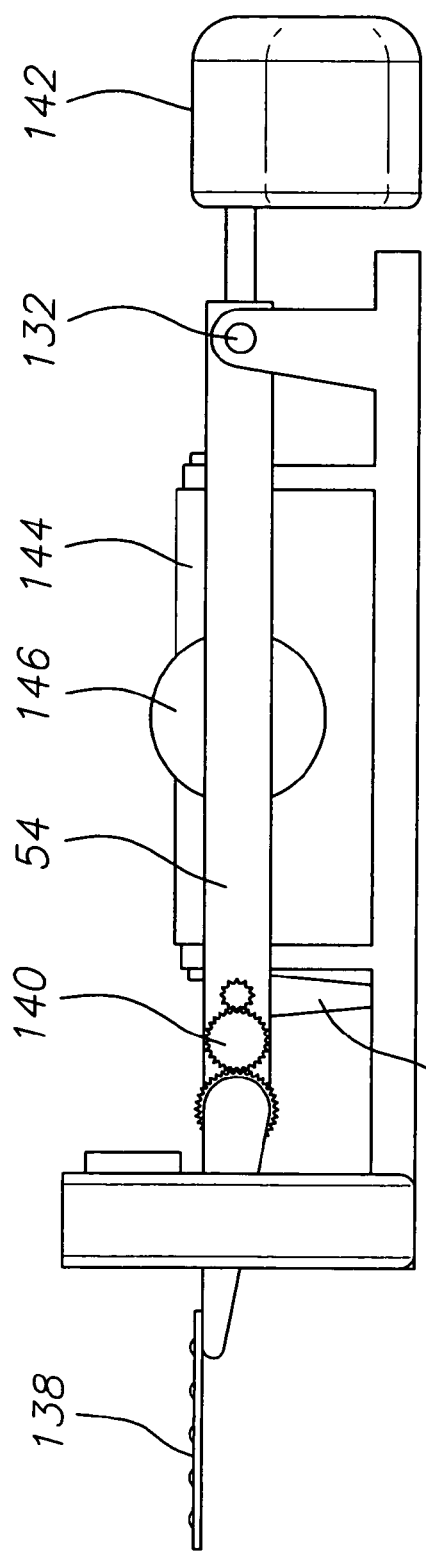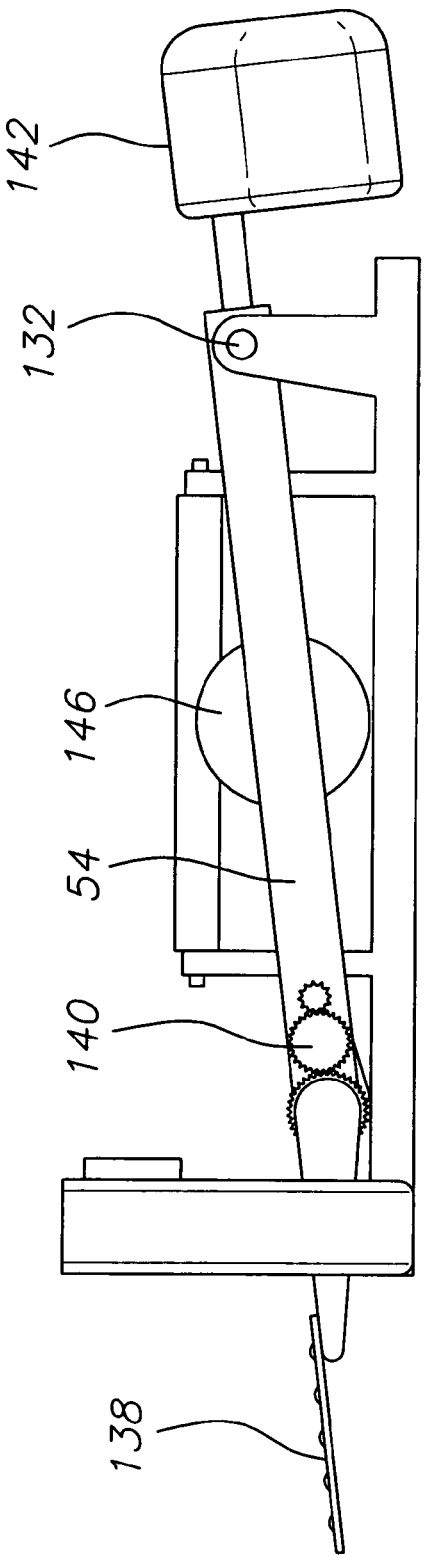
FIG.9A
FIG.9B

LATERAL WHEEL BALANCING APPARATUSES AND METHODS FOR LATERAL WHEEL BALANCING

CROSS-REFERENCE TO RELATED APPLICATION

This application claims the benefit of U.S. Provisional Application Ser. No. 60/487,337, filed on Jul. 14, 2003, the contents of which are fully incorporated herein by reference.

BACKGROUND OF THE INVENTION

The present invention relates to wheel balancers and more specifically to apparatuses for laterally balancing a wheel and to methods for laterally balancing wheels.

Vehicle wheels are vertically balanced for preventing vertical bounce of the wheel during various speeds. Vertical balancing of the wheel may be accomplished by many well known methods, as for example by using a spin balance machine. Vertical balancing determines the weight size and the location for placement of the weight on the wheel for vertically balancing the wheel.

As wheels are getting wider, they are also subject to shimmy, that sometimes can be extreme, that cannot be alleviated by vertically balancing a wheel. As such, apparatuses and methods for laterally balancing wheels are needed.

SUMMARY OF THE INVENTION

Apparatuses and methods for laterally balancing a wheel or for determining the location for placing a balancing weight on a wheel for laterally balancing such wheel are provided. In one exemplary embodiment, a method is provided including placing a slender elongate member on a surface, and placing the wheel over the elongate member such that a vertical plane generally perpendicular to the rotational axis of the wheel is generally parallel with a longitudinal axis of the elongate member. The method also requires moving the wheel laterally relative to the elongate member until the wheel is balanced on the elongate member or until the wheel shifts tilting from one side to tilting to an opposite side, and placing a balancing weight on the wheel at a lateral balancing location generally defined by the intersection of the wheel and a generally vertical plane through a longitudinal axis of the elongate member.

The method may further require determining the vertical location for placing the balancing weight and the size of the balancing weight using vertical balancing, and marking this location on a rim of the wheel. The balancing weight is then placed at a location on the rim defined by an intersection between a lateral plane generally encompassing the rotational axis of the wheel and the marking and the generally vertical plane.

In yet a further exemplary embodiment, a method for determining a location for placing a balancing weight on a wheel for laterally balancing the wheel is provided. The method requires placing a slender elongate member on a surface, placing the wheel over the elongate member such that a vertical plane generally perpendicular to the rotational axis of the wheel is generally parallel with a longitudinal axis of the elongate member. The method further requires moving the wheel laterally relative to the elongate member until the wheel is balanced on the elongate member or until the wheel shifts tilting from one side to tilting to an opposite side, and determining the location to place a balancing weight on the wheel at the intersection of the wheel and a generally vertical plane through a longitudinal axis of the elongate member, where the vertical plane is generally perpendicular to the rotational axis of the wheel.

This method may further require determining the vertical location for placing the balancing weight and the size of the balancing weight using vertical balancing, and marking this location on a rim of the wheel. The location of the placement of the weight on the rim is then defined by an intersection between a lateral plane generally encompassing the rotational axis of the wheel and the marking and the generally vertical plane.

In another exemplary embodiment, a lateral wheel balancing apparatus and wheel combination is provided including an elongate member, and a support supporting the elongate member. The combination further includes a wheel balanced on the elongate member with a plane of the wheel generally perpendicular to a rotational axis of the wheel generally coincidental with a longitudinal axis of the slender elongate member. The combination may also includes a marker for marking a location on the wheel wherein the plane intersects the wheel.

In a further exemplary embodiment, a lateral wheel balancing apparatus and wheel combination is provided including an elongate member, a support supporting the elongate member, and a wheel laterally balanced on the elongate member.

In yet another exemplary embodiment, a lateral wheel balancing apparatus is provided including a support structure, an elongate member supported by the support structure, and a marker assembly coupled to one of the support structure and the elongate member for marking a location for placing a balancing weight on the wheel.

In a further exemplary embodiment, a lateral wheel balancing apparatus system is provided including an elongate member, a support supporting the elongate member, and a wheel laterally balanced on the elongate member.

In another exemplary embodiment, a lateral wheel balancing apparatus is provided including a frame, a balancing member rotatably coupled to the frame for balancing a wheel placed on the balancing member, the balancing member rotating relative to the frame about a longitudinal axis of the balancing member, and at least one lateral support coupled to the frame for laterally supporting the wheel. In a further exemplary embodiment, a sensor is also provided to sense if the wheel is balanced on the balancing member. In another exemplary embodiment, the balancing member translates relative to the frame. In a further exemplary embodiment, the balancing member only rotates relative to the frame. In another exemplary embodiment, the apparatus also includes a marking assembly for marking a lateral balancing location on the wheel along a vertical plane encompassing a longitudinal axis of the balancing member or for placing a weight on such lateral balancing location.

In yet another exemplary embodiment, a lateral wheel balancing apparatus is provided including means to laterally support a wheel, and balancing means on which to laterally balance the wheel.

BRIEF DESCRIPTION OF THE DRAWINGS

FIG. 2 is a partial perspective view of a wheel being laterally balanced on another exemplary embodiment lateral wheel balancing apparatus of the present invention.

FIGS. 3A and 3B are perspective views of alternate exemplary embodiment, wheel laterally balancing apparatuses of the present invention.

FIGS. 9A and 9B are end views of the frame assembly incorporated in the apparatus shown in FIG. 8, in an unpivoted and a pivoted position, respectively.

DETAILED DESCRIPTION OF THE INVENTION

Figure 1:
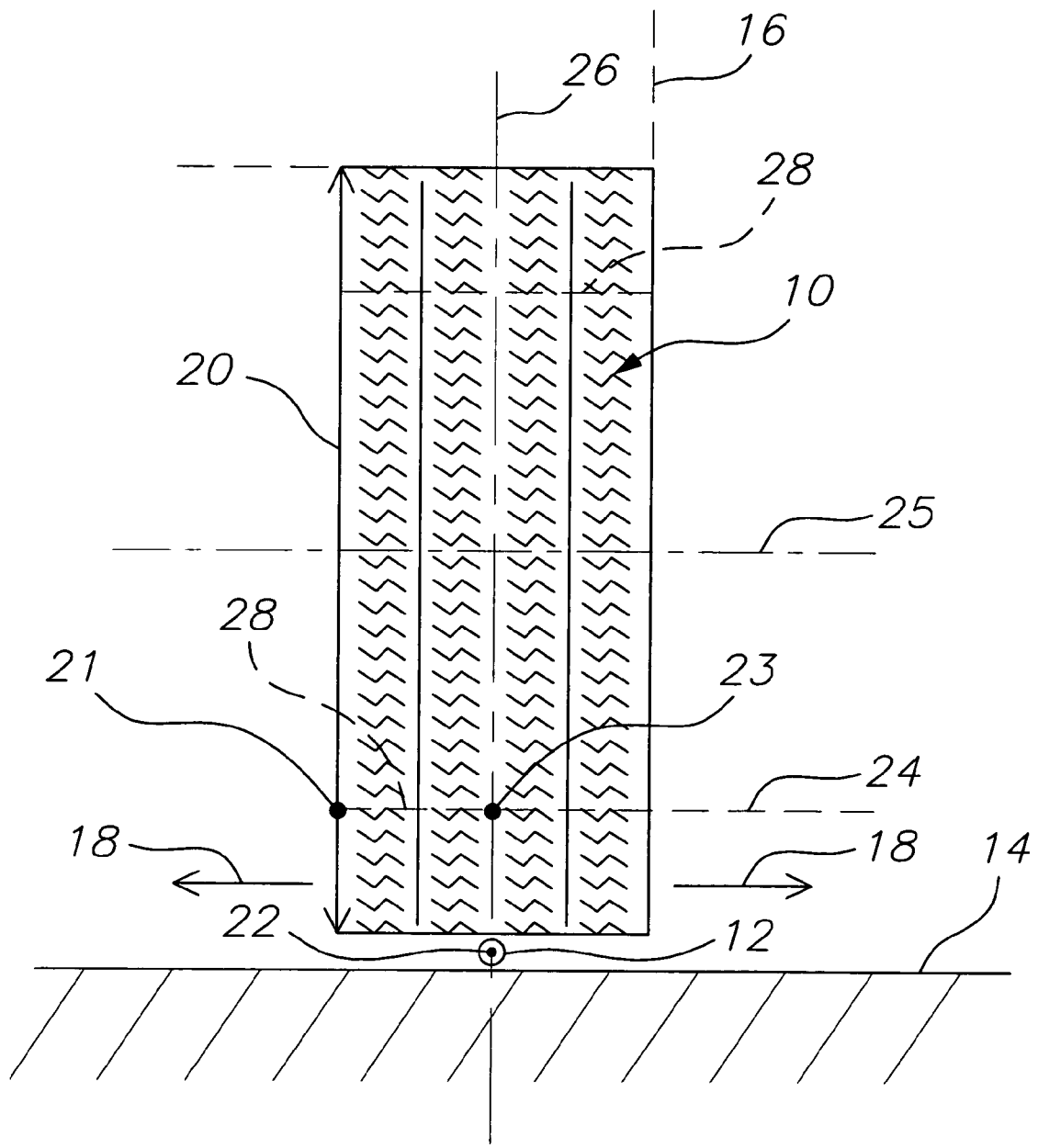
FIG. 1 is a front view of a wheel being laterally balanced on an exemplary embodiment lateral wheel balancing apparatus of the present invention.

Apparatuses for laterally balancing a wheel and methods for accomplishing the same are provided. In a first exemplary embodiment, a wheel 10 is vertically balanced using conventional vertically balancing apparatuses and/or methods so that the weight size as well as the placement of the balancing weight on the wheel rim along a vertical plane perpendicular to the rotational axis of the wheel (referred to herein for descriptive purposes as the "wheel vertical plane") is determined. For descriptive purposes the location of the weight determined by vertical balancing is referred to herein a the "vertical critical location." A stick, a rod or other elongated member or device 12 is placed on a surface 14 such as a floor, as for example shown in FIG. 1. The elongated device in the exemplary embodiment is slender and may have any type of cross-sectional shape. For example, the cross-sectional shape may be round (FIG. 1), or square (FIG. 2) or rectangular, or hexagonal, or any other polygonal shape. The elongated device is placed generally parallel to the wheel vertical plane 16. The wheel is rested on the elongated member with a diameter 20 of the wheel intersecting the vertical critical location 21 generally perpendicular to a longitudinal axis 22 of the elongate member. The wheel is moved laterally across the elongated member, as shown by arrows 18 in FIGS. 1 and 2, while still maintaining the elongated member generally parallel to the wheel vertical plane. This can be accomplished by sliding the wheel relative to the elongated member or by lifting and moving the wheel relative to the elongated member.

Typically when the wheel is placed on the elongated member, the wheel will tilt in one direction relative to the elongated member. As the wheel is moved across the elongated member, the wheel will eventually tilt in an opposite direction relative to the elongated member. The intersection 23 between a lateral line 24 through the critical vertical location 21 and generally parallel to the wheel rotational axis 25 and a vertical line 26 through the elongated member central longitudinal axis and parallel to the vertical plane, when the wheel tilt relative to the elongated member changes from one direction to the other or when the wheel is actually balanced on the elongated member, is the location on the wheel rim where the balancing weight needs to be placed on the wheel rim 28 for laterally balancing the wheel. The weight is then attached to the inner surface of the rim of the wheel and out of sight from the exterior of the wheel. When the wheel is placed on the elongated member, it can be placed with the vertical balance marking toward the bottom of the wheel (as shown in FIG. 1) or at an opposite location toward the top of the wheel.

In another exemplary embodiment as shown in FIG. 3A, the elongated member may have one or more transverse members 30 for stability. In the exemplary embodiment shown in FIG. 3A two transverse members extend transversely from the elongated member. In another exemplary embodiment as shown in FIGS. 3A and 3B, the one or more transverse members may rotate relative to the elongated member from a position relatively parallel to the elongated member to a position transverse or perpendicular to the elongated member. When the transverse member(s) are in a position relatively parallel to the elongated member, the elongated member with transverse member(s) take up less space. In a further exemplary embodiment the elongated member 12 may include a base 32 for better stability of the elongated member. In yet a further exemplary embodiment, a footing 34 may be incorporated at each end of the elongated member for enhancing the members stability.

Figure 4B:
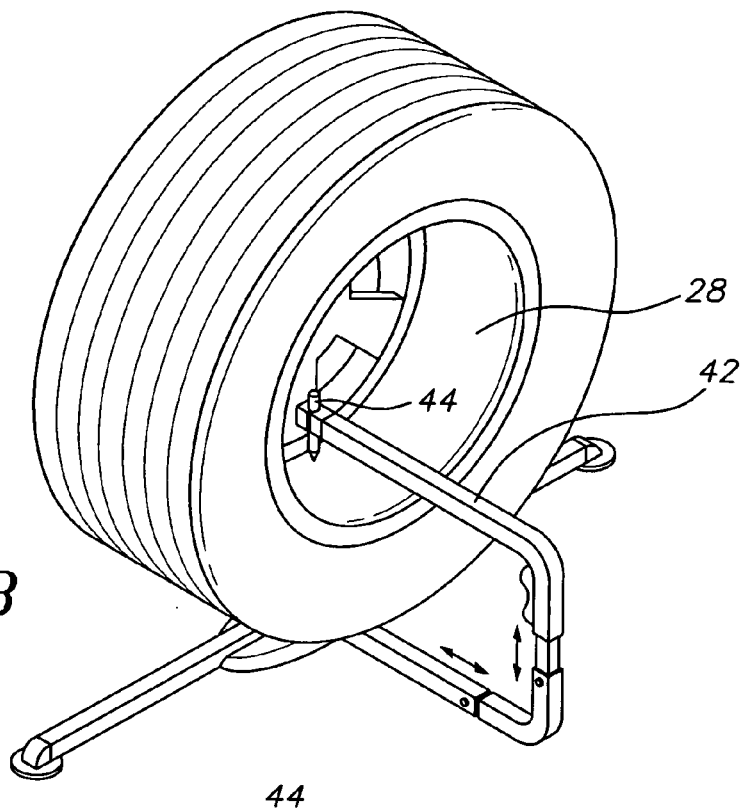
FIG. 4B is a perspective view of a wheel being balanced on the apparatus shown in FIG. 4A.
Figure 4A:
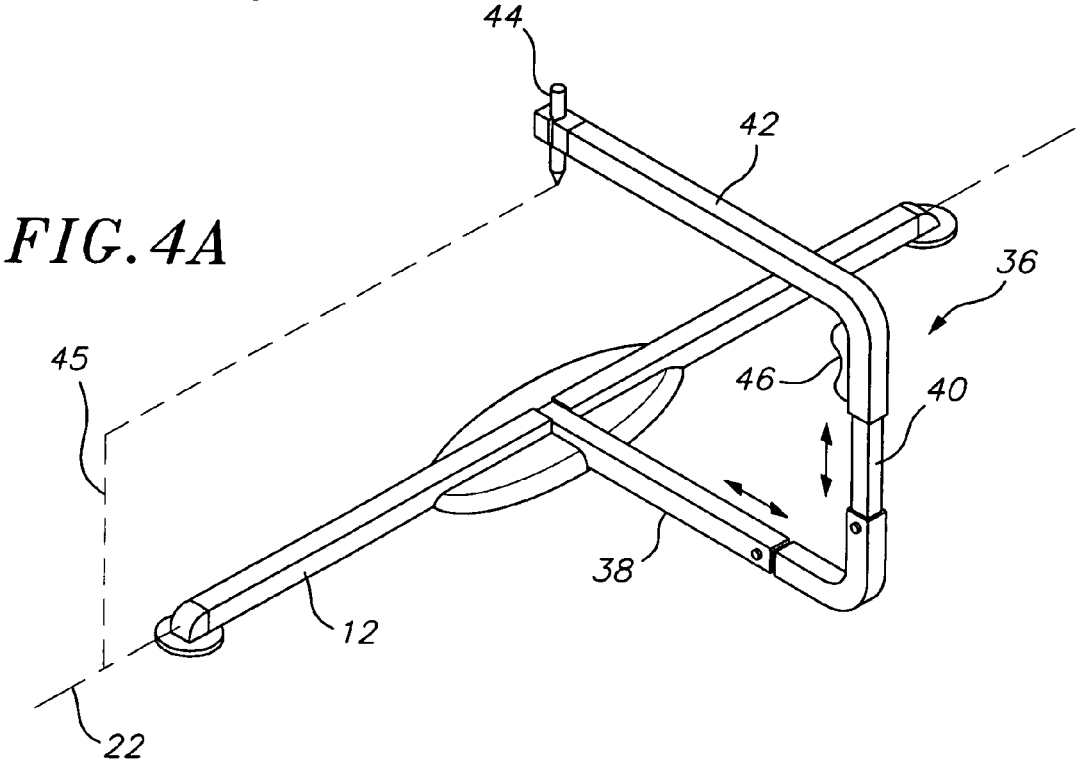
FIG. 4A is a perspective view of another exemplary embodiment lateral wheel balancing apparatus of the present invention.

In another exemplary embodiment as shown in FIG. 4A a marker assembly 36 may be coupled to the elongated member 12 as for example shown in FIG. 3A. In the exemplary embodiment shown in FIG. 3A, the marker assembly 36 includes a base arm 38 coupled to and extending transversely from the elongated member. A transverse arm 40 is coupled to the base arm and extends transversely from the base arm. A marker arm 42 extends transversely from the transverse arm 40. A marker 44 is coupled to an end of the marker arm 42. The marking tip of the marker is located along (or very proximate) a vertical plane 45 through the central axis 22 of the elongated member.

The height of the marker arm 42 can be adjusted relative to the elongated member 12. In the exemplary embodiment shown in FIG. 4A, this is accomplished by slideably coupling the marker arm to the transverse arm. A ratchet mechanism may be used to adjustably couple the marker arm to the transverse arm. A trigger 46 may be used to disengage the marker arm from the transverse arm so that the marker arm can slide relative to the transverse arm.

The height of the marker arm 42 relative to the elongated member is adjusted to accommodate different thickness wheels. Once a wheel is laterally balanced, the trigger 46 is activated allowing the marker arm to lower so that the marker 44 marks the location on the inner surface of the rim where the balancing weight needs to be placed, as shown for example shown in FIG. 4B.

In alternate exemplary embodiments, other type of coupling scenarios may be used to couple to marker arm to the transverse arm which would allow for the height level of the marker arm relative to the elongated member to be adjusted. For example, holes may be drilled at different levels through the marker arm and the transverse arm and a pin penetrating the holes of both arms may be used to couple the arms together.

Figure 5:
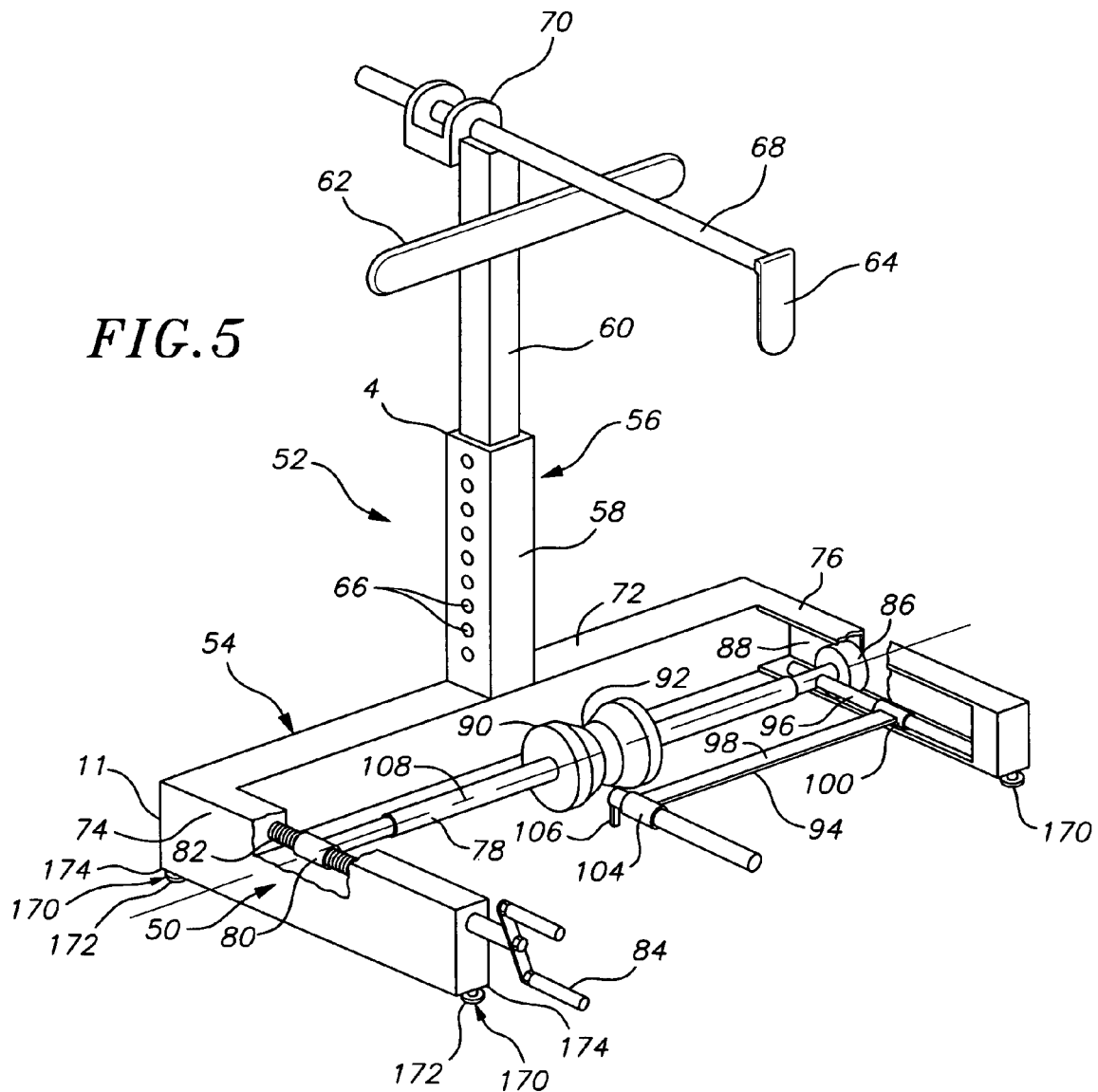
FIG. 5 is a perspective view of another exemplary embodiment lateral wheel balancing apparatus of the present invention.

In another exemplary embodiment, an apparatus 50 is provided for laterally balancing a wheel. The apparatus has a frame 52 which is adjustable in height, as for example shown in FIG. 5. The frame includes a base 54 from which extends an adjustable arm 56. The adjustable arm maybe a two-piece arm, as for example shown in FIG. 5, which includes a first member 58 and a second member 60 that can slide relative to the first member. The arm members can have any type of cross sectional shape. For example, as shown in FIG. 5, the first member is a bracket and the second member has a shape that can slide within the bracket. A plurality of hole sets 66 are formed along different height levels on the first member. Each hole set includes two holes, one on either side of the first member. One or more holes are formed through the second member. The second member can slide relative to the first member. A pin may be placed through the set of holes 66 on the first member and through the hole on the second member so as to lock the first member relative to the second member. Other ways of adjusting the height of the arm 56 well known in the art may also be used.

In the shown exemplary embodiment, a set of wheel lateral supports, i.e. a first wheel lateral support 62 and a second wheel lateral support 64 are coupled to the arm second member. The wheel lateral supports are coupled to the arm second member so that the spacing between the two lateral supports can be adjusted. In the exemplary embodiment, the first lateral support 62 is fixed to the arm second member 60. The second lateral support 64 extends from a bar 68 which is coupled to the arm second member via a lock or clamp 70. The bar 68 slides within the lock until a desired spacing between the two supports is achieved. When that it accomplished, the lock 70 is activated to clamp on the bar. Other ways of adjustably coupling the bar to the second member may also be used.

In the shown exemplary embodiment, the base includes a first portion 72 coupled to the arm 56 and two lateral portions 74, 76 extending laterally from opposite ends first portion 72. A centering member 78 is coupled laterally to both lateral portions 74, 76 such that it can slide relative to both lateral portions.

In the exemplary embodiment, a sleeve 80 having a threaded inner surface is transversely coupled to an end of the centering member proximate the first lateral member. A rod 82 having a threaded outer surface is rotatably mounted on the frame first lateral member 74 and is threaded to the inner surface of the sleeve 80. A handle 84, or a motor (not shown) may be used to rotate, i.e., thread the rod 82 relative to the sleeve 80. As the threaded rod is threaded through the inner surface of the sleeve, it causes the sleeve to translate along the threaded rod.

A shaft bearing 86 is coupled at the end of the centering member opposite the sleeve 80 and the centering member. The shaft bearing rides on a raceway 88 formed in the frame second lateral arm 76. Consequently, as the threaded rod 82 is rotated by the handle 84 or motor is causes the sleeve to translate along the rod and the centering bar to move along the frame lateral members and the shaft bearing to travel along raceway 88.

In another exemplary embodiment instead of a threaded rod and sleeve, another shaft bearing may be coupled to the end of the centering member and slideably coupled to a raceway formed on the frame first lateral member 74. With this embodiment, the centering bar can manually be slid relative to the frame lateral members.

In yet another exemplary embodiment, a wheel bottom support member 90 is coupled to the centering member 78. The wheel bottom support member in an exemplary embodiment as shown in FIG. 5, is an annular member having an outer surface having a diameter that is smallest at mid-length 92 and increases in either direction away from mid-length. In this regard, the outer surface of the wheel bottom support defines a curve in cross-section as viewed along the longitudinal axis of the wheel bottom support for cradling a wheel outer surface. In the exemplary embodiment, the wheel bottom support 90 can rotate relative to the centering member 78. In another exemplary embodiment, the wheel bottom support may be formed in two conical sections 146 that are mounted on the centering member, in an abutting or spaced apart relationship as for example shown in FIG. 10 so as to define the curve for cradling the wheel. In yet further exemplary embodiments, the wheel bottom support may be formed from one or multiple cylindrical members.

In another exemplary embodiment, a marker assembly 94 is coupled to the centering member. A longitudinal member 96 is coupled transversely to an end of the centering member. A transverse arm 98 is slideably and transversely coupled at one end to the longitudinal member 96. In the exemplary embodiment, this is accomplished by a sleeve 100 mounted at an end of the transverse arm 98 which is penetrated by the longitudinal member 96. A marker holder 102 is coupled to the other end of the transverse arm 98 via a sleeve 104. A marker 106 is mounted on the marker holder 104. When the sleeve 100 is slid relative to the longitudinal member 96 and the sleeve abuts the centering member, the marker 106 is located over the central longitudinal axis 108 of the centering member along a vertical plane through the central longitudinal axis 108.

Figure 6C:
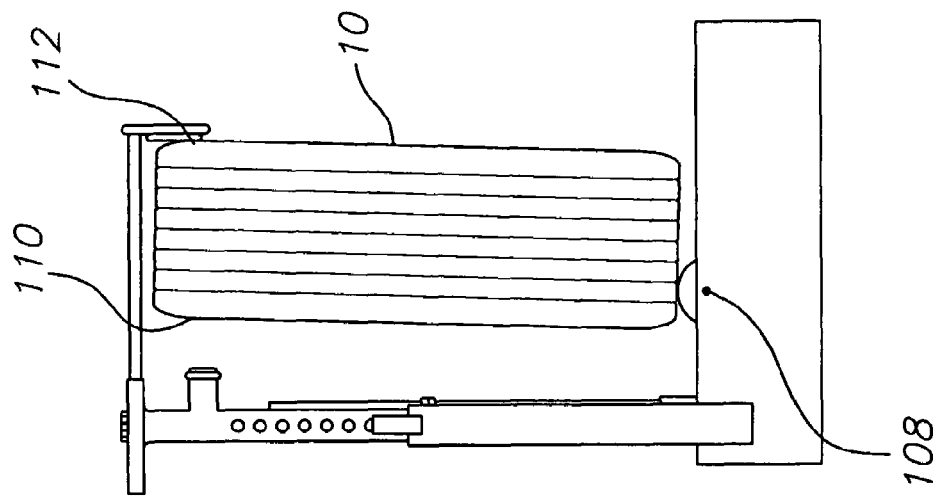
FIGS. 6A, 6B and 6C are end views of a lateral wheel balancing apparatus such as that shown in FIG. 5, with a wheel tilting in one direction, with a wheel being balanced, and the wheel tilting in an opposite direction, respectively.
Figure 6B:
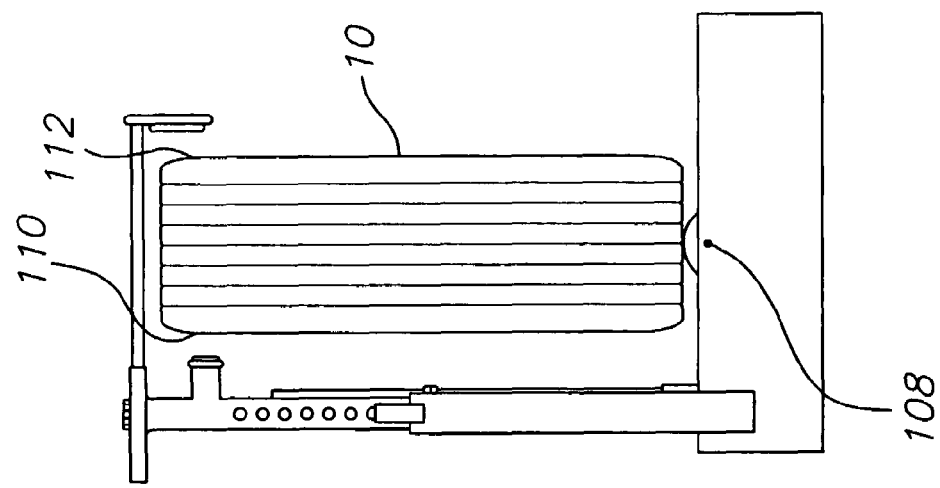
Figure 6A:
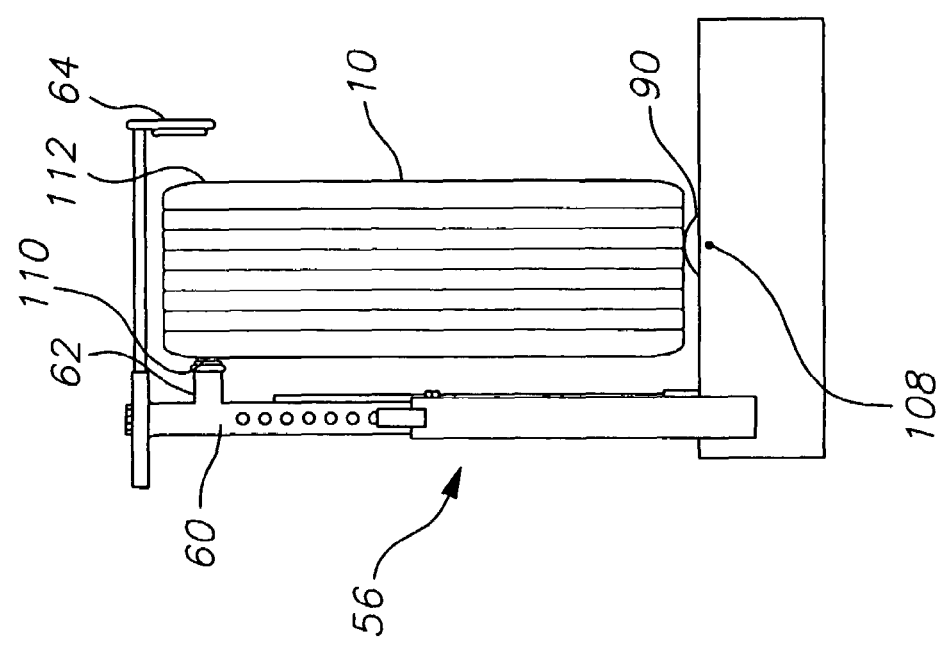

To laterally balance the wheel, after the wheel has been vertically balanced and the vertical critical location on the wheel rim is determined, the wheel lateral supports 62, 64 are moved relative to each other so that the spacing between the lateral support is greater than the width of the wheel. The wheel 10 is placed on the centering wheel bottom support 90 such that the vertical plane of the wheel is generally parallel to the central longitudinal axis 108 of the centering member, as for example shown in FIGS. 6A, 6B, and 6C, and the marked vertical critical location is at the lowest point on the rim. The height of the arm 56 is adjusted such that the lateral supports 62, 64 provide lateral support to the wheel sides 110, 112.

The threaded rod 82 is rotated using handle 84 or by a motor causing the centering member to move laterally relative to the wheel 10. When the centering member moves to a location where the wheel is balanced, i.e., it is not supported by either of the lateral support members, as for example shown in FIG. 6B or when the wheel moves from resting from one support member, as for example shown in FIG. 6A, to resting to another support member, as for example shown in FIG. 6C, or vice versa, the location of the centering member relative to the lateral axis of the wheel is marked on the wheel using the marker assembly 94. This is accomplished by moving the marker assembly towards the centering member until it stops. At that point, the marker marks the inside of the wheel at a location parallel to the central longitudinal axis of the centering member. The weight calculated by vertical balancing is then attached to the wheel at that location thus laterally balancing the wheel.

In another exemplary embodiment, a wheel bottom support member is not mounted on the centering member. Rather, the wheel is supported directly by the centering member. In another alternative exemplary embodiment, a marking assembly is not incorporated in the system. Rather, the marking is accomplished manually. In such, case the vertical critical location does not have to be at the lowest point on the wheel rim.

Figure 7:
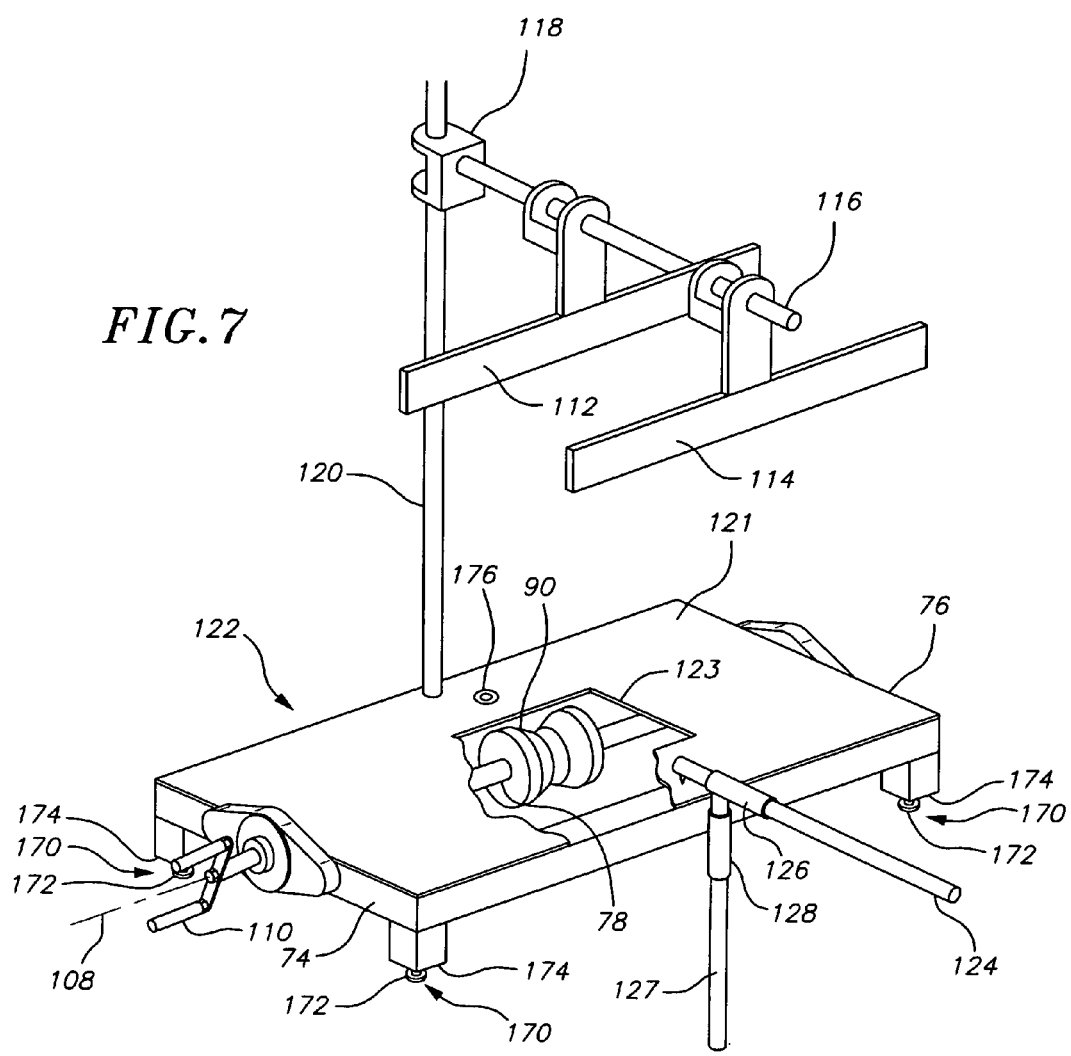
FIG. 7 is a perspective view of yet another exemplary embodiment lateral wheel balancing apparatus of the present invention.

In yet a further exemplary embodiment as shown in FIG. 7, the centering bar 78 is mounted between the two lateral members 74, 76 of the frame such that it can rotate relative to the lateral members but cannot translate along the longitudinal axis of the members. In another exemplary embodiment, a handle 110 is attached to an end of the centering member such that rotational handle rotates the centering member. Alternatively, a motor may be used to turn the centering member. A wheel bottom support maybe mounted over the centering member. In an exemplary embodiment, the wheel bottom support member is fixed relative to the centering bar such that rotation of the centering bar causes rotation of the wheel lower support member.

With this embodiment, the wheel lateral support members 112, 114 are mounted on a bar 116 such that the distance between the two members can be adjusted. This can be accomplished using various well known methods. For example, adjustable clamps may be used to mount each lateral support member to the bar. The bar then is mounted on a bracket 118 mounted on an arm 120 of the frame 122 such that it can slide relative to the frame arm 120. The bracket is slid at a desired location on the arm 120 and then clamped in place. A cover 121 may be placed over the frame. The cover has a cutout 123 to allow for the wheel bottom support 90 to extend above the cover.

With this embodiment, after the vertical critical location is determined, the wheel is placed on the wheel centering support member, if one is used, or on the centering bar, with the vertical critical location on the lowermost location on the inside surface of the wheel rim and with the vertical plane of the wheel generally parallel to the longitudinal axis of the centering member. The centering support member is then rotated, causing the wheel to move laterally which in turns causes the lateral support members 112, 114 to move the bar 116 and slide it relative to the bracket 118. When the wheel is balanced over the centering bar, i.e., when the wheel lateral walls are not supported by the lateral supports or when the wheel moves relative to the lateral support such that it goes from being supported by one of the lateral supports to being supporting by the other lateral supports, the lateral balancing point of the wheel has been found. A marker is then moved to mark that location on the wheel rim inner surface which is aligned with a vertical plane through the central longitudinal axis 108 of the centering member.

In other exemplary embodiments, different ways of marking or different marking assemblies maybe used in combination with the inventive apparatuses. For example, a marker 124 may be mounted through a sleeve 126 coupled to the frame 122 such that the marker can translate relative to the sleeve. A cap 124 at the end of the marker limits the travel of the marker, such that when the cap abuts the sleeve 126, the marker writing tip is located on, or is proximate, a vertical plane that extends through the longitudinal central axis of the centering member. The sleeve 126 is mounted to the frame as for example using a rod 127 that a slideably coupled to another sleeve 128 which is attached to the frame such that the rod can slide vertically and relative to the frame.

In yet other exemplary embodiments, either of the frame adjustable arms 56 and 120 may be used with either of the embodiment apparatuses disclosed in FIGS. 5 and 7.

Figure 8:
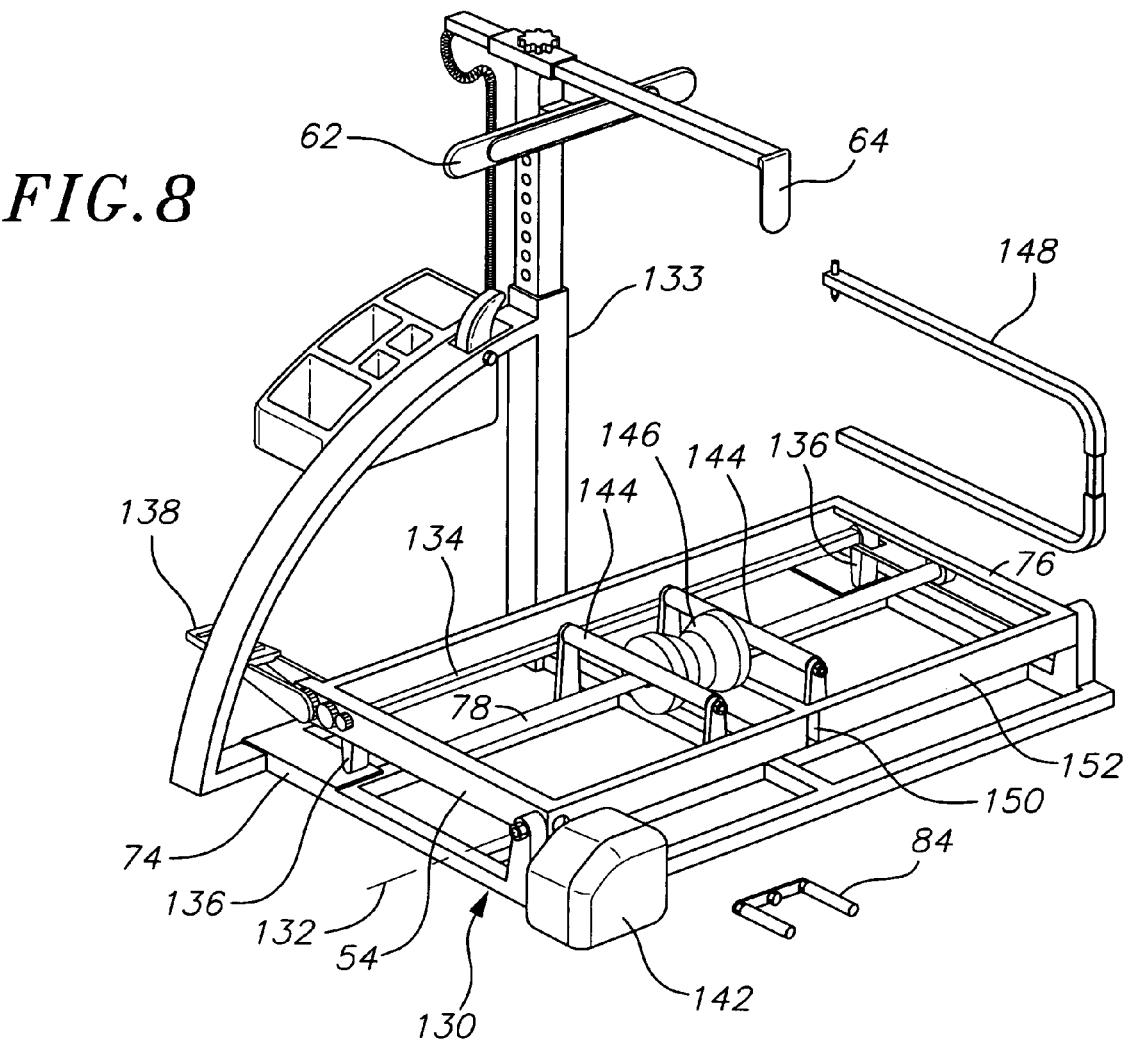
FIG. 8 is a perspective view of another exemplary embodiment lateral wheel balancing apparatus of the present invention not fully assembled.

In yet a further exemplary embodiment, an apparatus is provided that is similar to that shown in FIG. 5, with the exception that the frame base 54 is pivotally mounted on a frame support 130 along a pivot axis 132, as for example shown in FIGS. 8, 9A and 9B. Moreover the lateral supports 62 and 64 are coupled to an adjustable arm 133 extending from the frame support 130. In the shown exemplary embodiment, a camshaft 134 is rotatably coupled to the frame. In the exemplary embodiment shown, the camshaft is supported on lateral frame number 74 and 76. The camshaft includes two cam lobes 136. A pedal 138 is coupled to either of the frame lateral number 74 or 76. In the exemplary embodiment shown in FIG. 8, the pedal is coupled to lateral number 74. The pedal is coupled through gearing mechanism 140 to the camshaft 134, such that depression of the pedal causes the camshaft to rotate such that the lobes no longer support the frame in an upright position as shown in FIG. 9A, allowing the frame to pivot about pivot axis 132 as shown in FIG. 9B and collapse to the support. Depression of the pedal 138 again causes the camshaft to rotate in the opposite direction, and the lobes to contact the frame base support causing the frame to rotate in an opposite direction about the pivot axis 132, as shown in FIG. 9A so as to support the frame in a generally horizontal position. In other exemplary embodiments, other known mechanisms may be used, instead of a camshaft, to cause the frame base to pivot relative to the frame support.

In the exemplary embodiment shown in FIG. 8, a motor 142 is used to turn the threaded rod 82 (not shown) for moving the centering bar 78. Alternatively a handle 84 may be used.

In the exemplary embodiment shown in FIG. 8, two rollers 144 are also used which are rotatably mounted on the support 130 of the base. These rollers allow the user to easily rotate the wheel about its rotational axis once it is on the balancer. This helps the user position the vertical critical location, at the lowest section of the rim by rotating the wheel. As can be seen in FIG. 9B, when the frame is pivoted relative to the frame support, the centering bar and wheel bottom support 146 are below the upper surfaces of the rollers. When the frame is pivoted back to the horizontal position, the wheel bottom support 46 extends above the rollers.

In the exemplary embodiment shown in FIG. 8, a marker assembly 148, similar to the marker assembly shown in FIG. 4A is coupled to the frame of 54. The marker assembly is mounted through an opening 150, formed through a member 152 of the frame. A cover 152 may be coupled to the frame as shown in FIG. 10 and pivots relative to the frame support when the frame pivots.

With this exemplary embodiment, the wheel is placed on the rollers with the frame collapsed on the support as for example shown in FIG. 9B and with a wheel side wall supported by either of the lateral wheel supports 62, 64. The wheel is then rotated, if necessary, about its rotational axis on the rollers to bring the vertical critical location at lowermost part of the rim. The pedal 138 is then depressed to pivot the frame back to a horizontal position, as shown in FIG. 9A. When the frame is in the horizontal position, the wheel is seated on the wheel bottom support which lifts the wheel and separates it from the rollers. The wheel is then laterally balanced and the location of the weight is marked on the wheel rim as described herein as for example in relation to the embodiment shown in FIG. 5.

Figure 10:
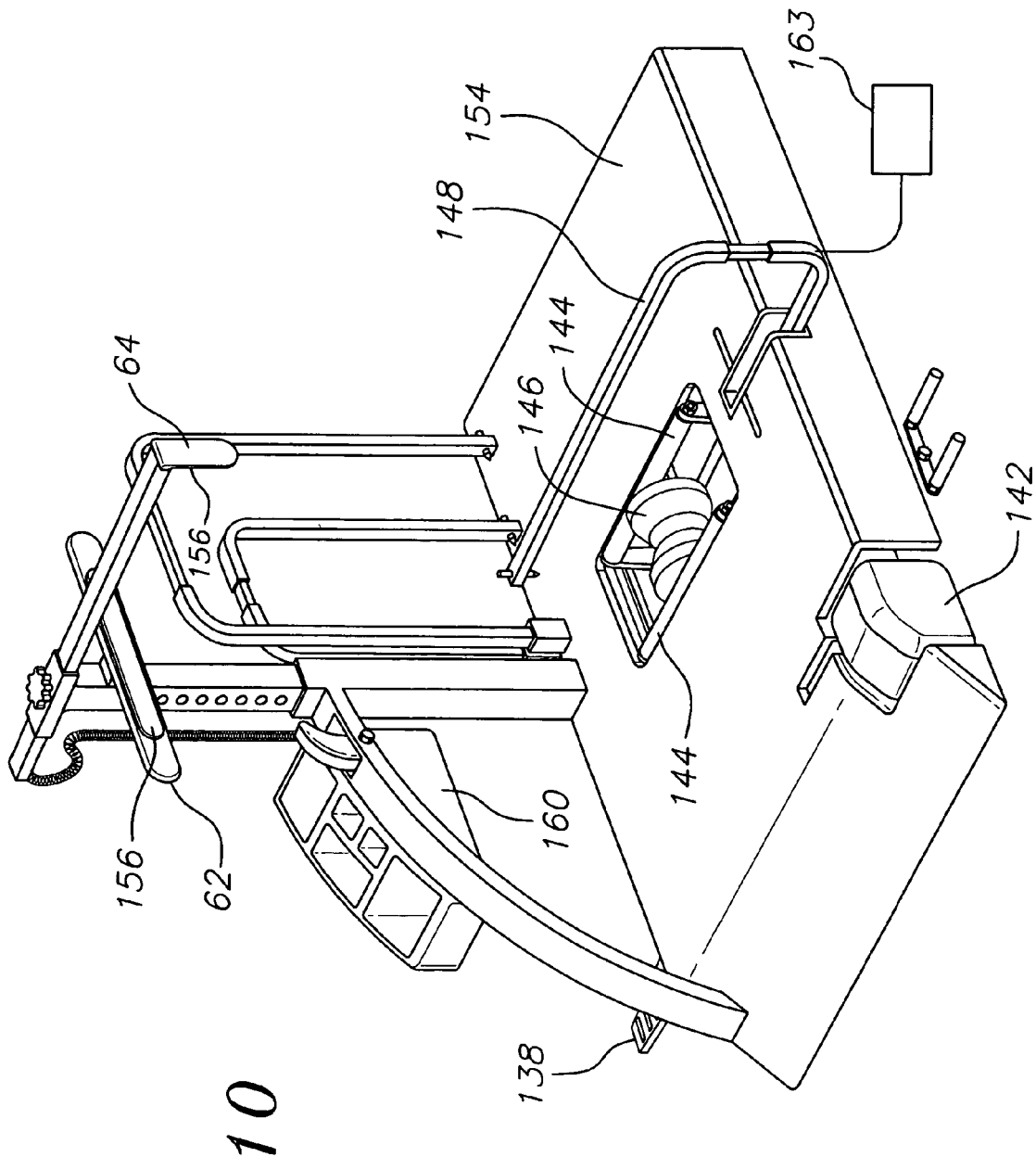
FIG. 10 is a perspective view of the fully assembled apparatus shown in FIG. 8.

It should be noted that a marking assembly similar or identical to the marking assembly 148 as shown in FIG. 10, and/or the rollers 144 may also be incorporated into the apparatuses disclosed in FIGS. 5 and 7.

In further exemplary embodiments, any of the aforementioned lateral wheel balancing apparatuses may be automated. For example, sensors such as infrared or piezoelectric sensors, or switches, or other types of sensors (collectively "sensors") 156 are mounted on the wheel lateral supports 62, 64 to sense whether the wheel is contacting either of the sensors or when the wheel has moved from being supported by one support to being supported by the other support. A motor may be used to move the marker assembly to cause the marker to mark the wheel. A central processor or other device 160 may be used to coordinate the movements of the various motors. For example, the wheel maybe mounted on the apparatus as previously described. Once one of the sensors senses that the wheel is supported by one of the lateral support members, the motor causing the centering bar to translate or to rotate is turned on until the sensors sense that the wheel is not supported by either of the lateral support members, or that the wheel has moved from being supported by one of the lateral supports to being supported by one of the other lateral supports, which in turn sends a signal to the controller causing the controller to stop the operation of the motor (e.g., motor 142) which causes movement or rotation of the centering member. At the same time, another motor 163 may cause the marking assembly to move into position to mark the location of the wheel where the weights need to be placed. Alternatively the marking may be done manually. In another exemplary embodiment, the adjustment to the length of arm 133 may also be accomplished with a motor using known methods.

As can be seen, the centering member serves as a balancing member in the embodiments where a wheel bottom support is not used. Similarly, the wheel bottom support serves as the balancing member in the embodiments where a wheel bottom support is used.

It should be noted in other alternate embodiments, the wheel is first laterally balanced, and a circumferential location defined by a circumferential line on the inner surface of the rim where the balancing weight needs to be placed is marked. The circumferential line is the line defined by the intersection of the wheel rim and wheel vertical plane encompassing the centering member or elongated member central longitudinal axis when the wheel is balanced. The wheel is then vertically balanced to locate the vertical critical location, along a vertical axis. The intersection between a line parallel to the rotational axis of the wheel and through the vertical critical location and the circumferential marking on the wheel defined by lateral balancing is the location where the balancing weight needs to be placed to laterally balance the wheel.

In other exemplary embodiments, any of the aforementioned laterally wheel balancing apparatuses and elongated devices may include adjustable footing to raise and lower each footing for leveling the apparatus. The footing may comprise adjustable legs or feet 170 as for example shown in FIGS. 5 and 7. For example, each foot may thread into the apparatus so that the distance between a foot base 172 and the base 174 of the apparatus is varied as the foot is threaded to the apparatus. In addition, the apparatuses may included a level indicator, as for example a bubble level 176 shown in FIG. 7, that indicates when the apparatus is level. It is recommended that the apparatuses are level prior to laterally balancing a wheel.

Moreover, the marker incorporated in a marker assembly of any of the aforementioned exemplary embodiments, may be a writing instrument such as a pen, pencil, wax crayon, chalk, etc. or a scribe, a pointer, or a device that dispenses stickers that are used to mark the location of weight placement, or a device that dispenses the balancing weight. With the latter embodiment, the marker dispenses the required weight at the desired location. Consequently, with this later embodiment, actual marking does not have to occur. Thus, "marker" as used herein should be understood to mean any of these types of markers. Similarly, a "marker assembly" should be understood to mean a marker assembly incorporating any of the aforementioned markers. Moreover, with any of the aforementioned embodiments, instead of marking the location for placing the weight for laterally balancing the wheel, the weight itself may be placed and adhered at the location determined for laterally balancing the wheel without marking. Consequently, "marking" the location as used herein should also be understood to mean identifying the location. For example, a marker or a marker assembly or other means may be used to identify the location for placing the balancing weight without marking such location.

The preceding description has been presented with reference to exemplary embodiments of the invention. Persons skilled in the art and technology to which this invention pertains will appreciate that alterations and changes in the described structures and methods of operation can be practiced without meaningfully departing from the principal, spirit and scope of this invention. Accordingly, the foregoing description should not be read as pertaining only to the precise structures and methods described and shown in the accompanying drawings.

What is claimed is:

1. A method for laterally balancing a wheel comprising:
   placing an elongate member on a surface;
   placing the wheel over the elongate member such that a vertical plane generally perpendicular to the rotational axis of the wheel is generally parallel with a longitudinal axis of the elongate member;
   moving the wheel laterally relative to the elongate member until the wheel is balanced on the elongate member or until the wheel shifts tilting from one side to tilting to an opposite side; and
   placing a balancing weight on the wheel at a lateral balancing location generally defined by the intersection of the wheel and a generally vertical plane through a longitudinal axis of the elongate member.

2. The method as recited in claim 1 wherein moving the wheel laterally relative to the elongate member comprises moving the wheel.

3. The method as recited in claim 1 wherein moving the wheel laterally relative to the elongate member comprises moving the elongate member.

4. The method as recited in claim 1 further comprising:
   determining the vertical location for placing the balancing weight and the size of the balancing weight using vertical balancing; and
   marking this location on rim of the wheel, and wherein placing comprises placing the balancing weight at a location on the rim defined by an intersection between a lateral plane generally encompassing the rotational axis of the wheel and the marking and said generally vertical plane.

5. The method as recited in claim 4 further comprising placing the wheel on the elongate member such that the marking is located on a lowermost portion of the rim.

6. The method as recited in claim 4 wherein determining the vertical location is accomplished prior to defining the lateral balancing location.

7. The method as recited in claim 1 wherein the location is a circumferential location defined around the wheel, and wherein the method further comprises:
   determining the vertical location and the size of the balancing weight using vertical balancing; and
   marking this location with a marking on a rim of the wheel, and wherein placing comprises placing the balancing weight at a location on the rim defined by an intersection between a lateral plane generally encompassing the rotational axis of the wheel and the marking and said circumferential location.

8. The method as recited in claim 7 wherein the circumferential location is determined prior to determining the vertical location.

9. A lateral wheel balancing apparatus and wheel combination comprising:
an elongate member;
a support supporting the elongate member;
a wheel balanced on the elongate member with a plane of the wheel generally perpendicular to a rotational axis of the wheel generally coincidental to a longitudinal axis of the elongate member; and
a marker identifying a location on the wheel wherein said plane intersects the wheel.

10. The combination as recited in claim 9 wherein the marker is coupled to a marker assembly which is coupled to at least one of said slender elongate member and support, wherein said marker assembly when moved toward the wheel stops at the location.

11. A lateral wheel balancing apparatus comprising:
a support structure;
an elongate member supported by the support structure;
a marker assembly coupled to one of said support structure and said elongate member for identifying a location for placing a balancing weight on the wheel.

12. The apparatus as recited in claim 11 further comprising at least one support member extending transversely relative to the elongate member for supporting the elongate member.

13. The apparatus as recited in claim 12 wherein the at least one support member rotates relative to the elongate member from a position relatively parallel to the elongate member to a position transverse to the elongate member.

14. A lateral wheel balancing apparatus comprising:
a frame;
a balancing member rotatably coupled to the frame for balancing a wheel placed on said balancing member, said balancing member rotating relative to the frame about a longitudinal axis of the balancing member; and
at least one lateral support coupled to the frame for laterally supporting a wheel.

15. The apparatus as recited in claim 14 wherein the balancing member is mounted around a shaft coupled to the frame.

16. The apparatus as recited in claim 14 further comprising an arm extending vertically relative to the frame wherein the at least one lateral support is coupled to said arm.

17. The apparatus as recited in claim 16 wherein the arm has an adjustable length.

18. The apparatus as recited in claim 16 wherein the distance between the balancing member and the lateral support is adjustable.

19. The apparatus as recited in claim 14 comprising two lateral supports spaced apart from each other by a distance, wherein the distance between said two lateral supports is adjustable.

20. The apparatus as recited in claim 14 wherein the balancing member translates relative to the frame.

21. The apparatus as recited in claim 14 further comprising a frame support, wherein the frame is pivotably coupled to the frame support.

22. The apparatus as recited in claim 21 wherein the balancing member is mounted around a shaft coupled to the frame.

23. The apparatus as recited in claim 22 further comprising an arm extending vertically from the frame support, wherein the at least one lateral support is coupled to said arm.

24. The apparatus as recited in claim 23 wherein the arm has an adjustable length.

25. The apparatus as recited in claim 21 further comprising a cam, wherein rotation of the cam causes the frame to pivot about the support.

26. The apparatus as recited in claim 21 further comprising a pair of rollers mounted on the support transversely to the balancing member.

27. The apparatus as recited in claim 26 further comprising a marker assembly for identifying a location on the wheel along a vertical plane encompassing the longitudinal central axis of the balancing member.

28. The apparatus as recited in claim 15 wherein the balancing member translates relative to the frame, the apparatus further comprising:
a sensor coupled to a lateral support, wherein the sensor senses whether a wheel is balanced on the balancing member; and
a motor causing the balancing member to translate when the sensor senses that the wheel is not balanced on the balancing member.

29. The apparatus as recited in claim 28 further comprising:
a marking assembly for marking a lateral balancing location on the wheel along a vertical plane encompassing a longitudinal axis of the balancing member; and
a second motor causing the marking assembly to mark the wheel at the appropriate location when the sensor senses that the wheel is balanced.

30. The apparatus as recited in claim 14 further comprising:
a sensor coupled to a lateral support, wherein the sensor senses whether a wheel is balanced on the balancing member; and
a motor causing the balancing member to rotate when the sensor senses that the wheel is not balanced on the balancing member.

31. The apparatus as recited in claim 30 further comprising:
a marking assembly for marking a lateral balancing location on the wheel along a vertical plane encompassing a longitudinal axis of the balancing member; and
a second motor causing the marking assembly to mark the wheel at the appropriate location when the sensor senses that the wheel is balanced.

32. The apparatus of claim 14 further comprising at least one sensor for determining if the wheel is balanced on the balancing member.

33. A lateral wheel balancing apparatus comprising:
means to laterally support a wheel; and
balancing means on which to laterally balance the wheel.

34. The apparatus as recited in claim 33 further comprising means to identify the location on the wheel where a weight needs to be placed to laterally balanced a wheel.

35. The apparatus as recited in claim 34 wherein the location is a point.

36. The apparatus as recited in claim 34 wherein the location is a circumferential line.

37. The apparatus as recited in claim 33 further comprising a motor to drive the balancing means.

38. The apparatus as recited in claim 33 further comprising a sensor for ascertaining if the wheel is laterally balanced on the balancing means.

39. A method for determining a location to place a balancing weight on a wheel for laterally balancing the wheel comprising:
- placing a slender elongate member on a surface;
- placing the wheel over the elongate member such that a vertical plane generally perpendicular to the rotational axis of the wheel is generally parallel with a longitudinal axis of the elongate member;
- moving the wheel laterally relative to the elongate member until the wheel is balanced on the elongate member or until the wheel shifts tilting from one side to tilting to an opposite side; and
- determining the location to place a balancing weight on the wheel at the intersection of the wheel and a generally vertical plane through a longitudinal axis of the elongate member, said plane being generally perpendicular to the rotational axis of the wheel.

40. The method as recited in claim 39 further comprising:
- determining the vertical location for placing the balancing weight and the size of the balancing weight using vertical balancing; and
- marking this location on a rim of the wheel, and wherein determining comprises determining the location on the rim defined by an intersection between a lateral plane generally encompassing the rotational axis of the wheel and the marking and said generally vertical plane.

41. The method as recited in claim 40 further comprising placing the wheel on the elongate member such that the marking is located on a lowermost portion of the rim.

42. A lateral wheel balancing apparatus and wheel combination comprising:
- a slender elongate member;
- a support supporting the elongate member; and
- a wheel laterally balanced on the elongate.

43. A method for identifying a laterally balancing location on a wheel comprising:
- providing an object;
- placing the wheel over the object, wherein the wheel comprises a width as measured along an axis parallel to an axis of rotation of the wheel, and wherein the object comprises a width, said object width being narrower than the width of the wheel;
- moving the wheel over the object and along the object width to laterally balance the wheel on the object; and
- identifying a plane generally perpendicular to a rotational axis of the wheel and through the object, wherein said laterally balancing location is at the intersection of the plane with the wheel.

44. A method as recited in claim 43 wherein moving comprises laterally moving the wheel along the rotational axis.

45. A method as recited in claim 43 wherein the object is elongate.

46. A method as recited in claim 43 further comprising placing a weight on said balancing location.

47. A method as recited in claim 46 further comprising determining the weight value by vertically balancing the wheel.

* * * * *

UNITED STATES PATENT AND TRADEMARK OFFICE
CERTIFICATE OF CORRECTION

| | |
|---|---|
| PATENT NO. | : 6,976,385 B2 |
| APPLICATION NO. | : 10/890634 |
| DATED | : December 20, 2005 |
| INVENTOR(S) | : Okada et al. |

It is certified that error appears in the above-identified patent and that said Letters Patent is hereby corrected as shown below:

On the Title page

[57] Abstact, line 5    Delete "a elongated",
             Insert --an elongated--

In the Specification

Column 2, line 20    Delete "includes",
             Insert --include--

Column 3, line 2     Delete "embodiment, wheel laterally",
             Insert --embodiment lateral wheel--

Column 3, line 41    Delete a the",
             Insert --as the--

Column 4, line 57    Delete "couple to",
             Insert --couple the--

Column 5, line 1     Delete "maybe",
             Insert --may be--

Column 5, line 51    Delete "motor is",
             Insert --motor, it--

Column 6, line 62    Delete "such, case",
             Insert --such case,--

UNITED STATES PATENT AND TRADEMARK OFFICE
CERTIFICATE OF CORRECTION

PATENT NO.         : 6,976,385 B2
APPLICATION NO. : 10/890634
DATED               : December 20, 2005
INVENTOR(S)       : Okada et al.

It is certified that error appears in the above-identified patent and that said Letters Patent is hereby corrected as shown below:

| | |
|---|---|
| Column 7, line 6 | Delete "maybe", Insert --may be-- |
| Column 9, line 43 | Delete "laterally", Insert --lateral-- |
| Column 9, line 50 | Delete "included", Insert --include-- |
| Column 10, line 15 | Delete "principal", Insert --principle-- |

In the Claims

| | |
|---|---|
| Column 12, line 13, Claim 28 | Delete "15", Insert --14-- |
| Column 14, line 3, Claim 42 | Delete "on the elongate", Insert --over the elongate member-- |

Signed and Sealed this

Eleventh Day of July, 2006

JON W. DUDAS
*Director of the United States Patent and Trademark Office*